Dec. 19, 1950 F. A. KOLSTER 2,534,606

DOUBLE SUPERHETERODYNE RADIO RECEIVER

Filed Aug. 25, 1945 2 Sheets-Sheet 1

INVENTOR.
Frederick A. Kolster
BY
[signature]
ATTORNEY

DOUBLE SUPERHETERODYNE RADIO RECEIVER

INVENTOR.
Frederick A. Kolster
BY
ATTORNEY

Patented Dec. 19, 1950

2,534,606

UNITED STATES PATENT OFFICE 2,534,606

DOUBLE SUPERHETERODYNE RADIO RECEIVER

Frederick A. Kolster, Washington, D. C.; Muriel Kolster administratrix of said Frederick A. Kolster, deceased Application August 25, 1945, Serial No. 612,692

8 Claims. (Cl. 250—20)

The present invention relates to radio communication and the like, more particularly to an improved tuning or selecting system for receiving signals over an extended band of transmitting frequencies.

Among the objects of the invention is to afford a selective tuning over a wide band of transmitting frequencies by means of multiple tuning circuits and a wave switching arrangement which is both simple in design and easy to operate; which requires a minimum number of parts and circuits by the use of multiple frequency conversion; which may cover any desired extended range of operating frequencies without exceeding the practical tuning range of the standard commercial variable condenser; which can be used equally well within the low, medium and high frequencies ranges; and which can be easily adapted to and incorporated in existing receivers to extend operating range thereof, thus preventing their becoming obsolete due to changes in frequency allocation or other reasons.

Another object of the invention is to provide a combined antenna system suitable for receiving both long or medium as well as short and ultra-short waves, substantially without any changes in the antenna proper.

An ancillary object is to provide a harmonic free oscillator for both fixed or adjustable oscillating frequency and characterized by simplicity of design as well as efficiency in operation.

Figure 1:
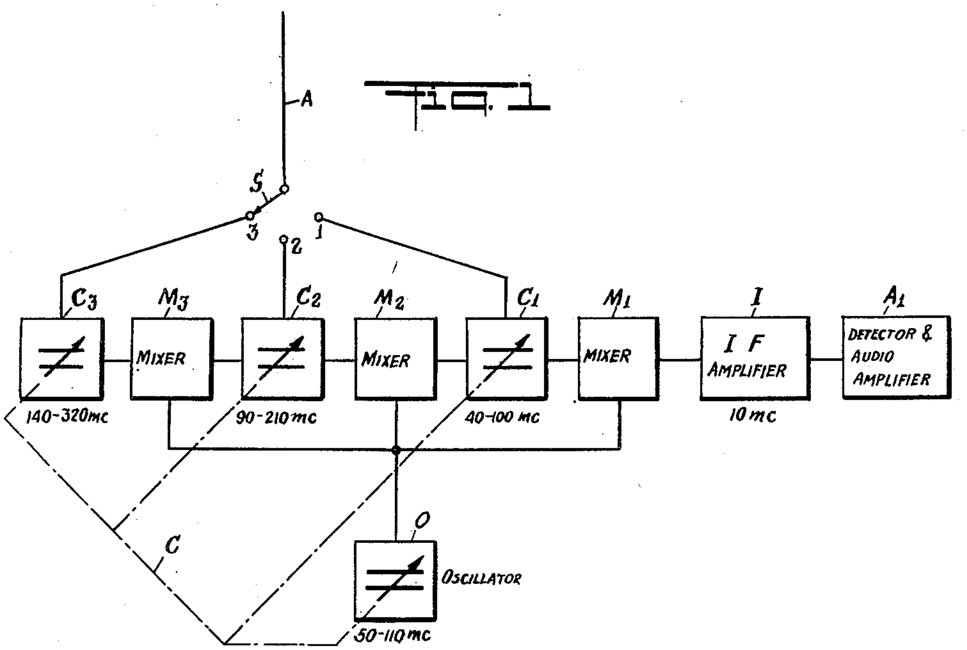
Figure 2:
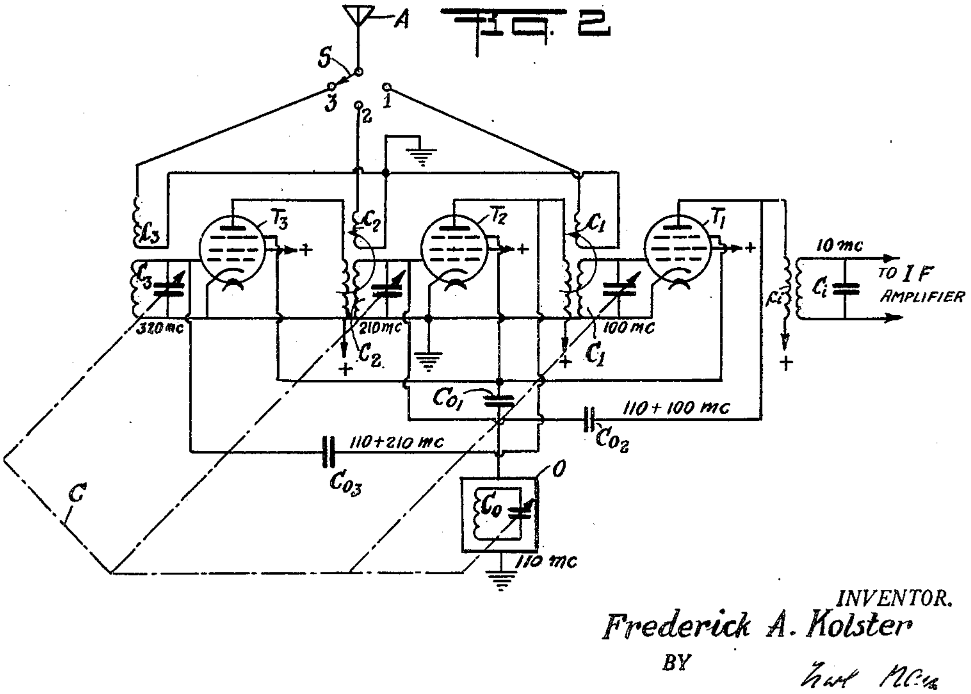
Figures 3, 3A:
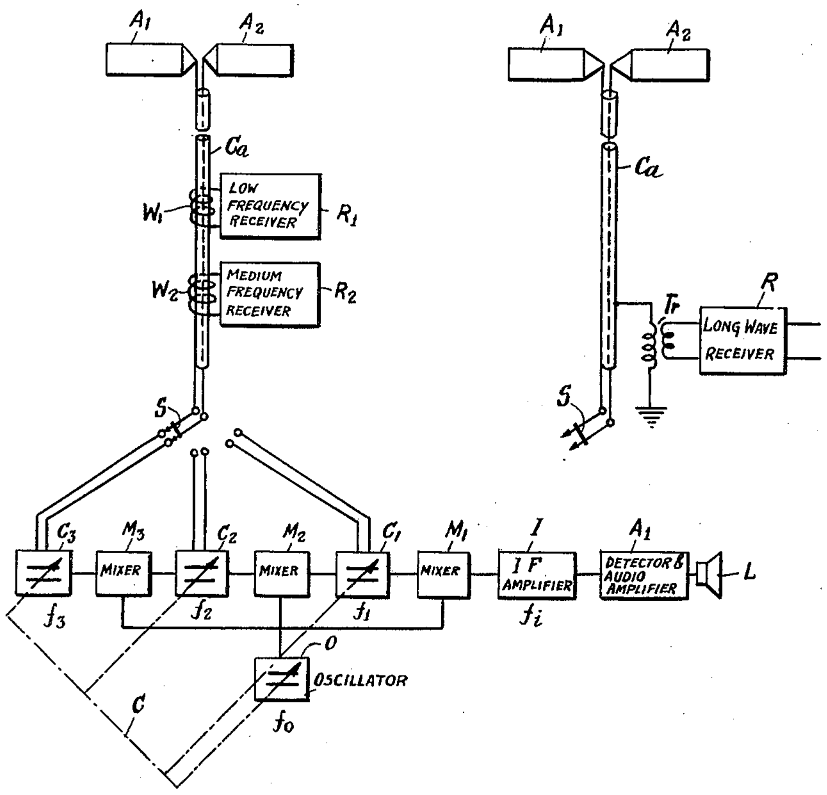
Figure 4:
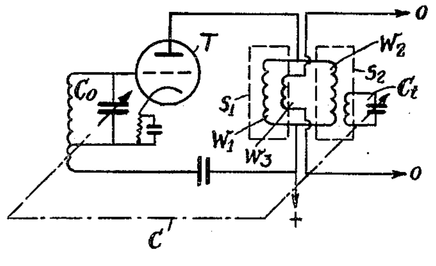
Figure 5:
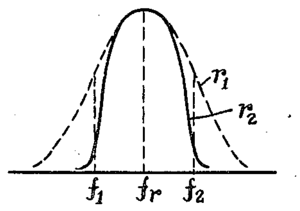

These and further objects and novel aspects of the invention will become more apparent from the following detailed description taken in reference to the accompanying drawings forming part of this specification and wherein:

Figure 1 shows a basic broad band radio frequency tuning system in block diagram form and constructed in accordance with the principles of the invention: Figure 2 is a circuit diagram for a system similar to Figure 1 and embodying additional features of improvement according to the invention; Figure 3 is a block diagram illustrating the combination of a short-long wave receiving antenna with a high frequency receiver according to the invention and a standard medium or low-frequency receiver; Figure 3A is a partial view of Figure 3 showing a modification of the latter; Figure 4 is a circuit diagram of an improved oscillator especially suited for use in connection with the invention; and Figure 5 shows a pair of resonance curves explanatory of the operation of Figure 4.

Like reference characters identify like parts throughout the different views of the drawings.

With the above objects in view, the invention involves generally the use of a number of tunable receiving circuits, selectively connectable to a common input circuit or antenna and coupled with each other in cascade through mixers or frequency converters, the last tuning circuit being coupled through a further frequency changer or mixer to an intermediate frequency amplifier. All of said mixers are furthermore coupled with or excited by a common local oscillator arranged for uni-control with all said tunable receiving circuits. The tuning ranges or sub-bands covered by said circuits overlap each other and are so related with each other and the tuning range of said oscillator as to result in a common final intermediate frequency for the entire tuning or operating range of the system by multiple frequency conversion of said sub-bands progressively increasing towards the high frequency end, in a manner as will appear more clearly from the description of the specific receiving system of Figure 1 presented in the following.

Referring more particularly to the embodiment as shown in Figure 1 of the drawing, it has been assumed that the total desired frequency or operating range should extend from 40 mc. to about 300 mc. and that the tuning range of each sub-band should not exceed a ratio of 2.5 to 1 which is within the tuning range of the standard commercial type of variable condenser known in the art. Accordingly, since the total frequency range of the system has a ratio of 7.5 to 1, the number of sub-bands required will be 3 to result in an individual tuning range within the limits given.

Thus, in Figure 1, the three tuning circuits shown in block diagram form at $C_1$, $C_2$ and $C_3$ which may be of any type comprising variable tuning condensers as shown or equivalent tuning means, are selectively connectable to a common antenna A by means of a wave switch S having contacts 1, 2 and 3 which may be connected to the respective circuits in the manner shown and well understood. Circuit $C_3$ is furthermore connected to circuit $C_2$ by way of a mixer or frequency changer $M_3$ which may be in the form of an electronic modulator of the multi-grid type or the like; circuit $C_2$ is connected to circuit $C_1$ through a further mixer $M_2$; and circuit $C_1$ is connected to the intermediate frequency amplifier I by way the final mixer or frequency converter $M_1$.

All the three mixers $M_1$, $M_2$ and $M_3$ are furthermore excited by a common heterodyning frequency supplied by the single local oscillator O which comprises frequency control means such as a variable tuning condenser coupled for uni-control with all the tuning control means of the circuits $C_1$, $C_2$ and $C_3$ through a common coupling or control member indicated schematically at C in the drawing and well understood by those skilled in the art. The output of the intermediate frequency amplifier may be demodulated and further amplified at audio frequency in the detector and audio amplifier $A_1$ before being applied to a suitable output or translating device such as a loudspeaker, in a manner well known in the art.

Assuming a fixed intermediate frequency of 10 mc., chosen to suit existing and other requirements, the tuning range of the various sub-bands will be as indicated in the drawing, i. e. circuit $C_1$ is adjustable over a partial range or sub-band of 40 mc. to 100 mc., circuit $C_2$ covers a range of 90 mc. to 210 mc. and circuit $C_3$ is adjustable over a range of 140 mc. to 320 mc., while the oscillator O has a frequency adjusting range of 50 to 110 mc. All the tuning condensers or other adjustable tuning means of circuits $C_1$, $C_2$ and $C_3$ as well as that of the oscillator O may be of the straight line frequency type or the oscillator may be properly tracked by the use of padding condensers or in any other suitable manner known in the art.

In an arrangement of this type, it is understood that all the frequencies received in any position of the wave switch S will be heterodyned or converted to the common intermediate frequency of 10 mc., either in a single step for the lowest sub-band received by circuit $C_1$ and corresponding to wave switch position 1, or in multiple and successive conversions for the sub-bands of circuits $C_2$ and $C_3$ in the positions 2 and 3, respectively, of the wave switch arrangement. Thus, assuming the wave switch S to be in the position 2 for receiving the frequency sub-band 90 mc. to 210 mc., the heterodyning in the mixer $M_2$ by the common oscillator O will result in a conversion of this band to the band 40 mc. to 100 mc., i. e. corresponding to the tuning range of the receiving circuit $C_1$, from which, by further conversion in the mixer $M_1$, the final intermediate frequency of 10 mc. is obtained. In the position 3 of the switch for receiving the sub-band 140 mc., to 320 mc., the signals will be subjected to a triple conversion, whereby to again result in the final intermediate frequency of 10 mc., as is understood.

If electronic mixer tubes are used for the frequency conversion in $M_1$, $M_2$ and $M_3$, these may be utilized to give a suitable amplification in such a manner that, as the sub-bands assume higher frequencies, the amplification is progressively increased to compensate for the inherent inefficiency at the higher frequencies.

It will be noted, in Figure 1, that a resultant all over frequency range of the receiver from 40 mc. to 320 mc. covering a ratio of 8 to 1 is obtained by use of a single converting oscillator having a frequency adjusting range of only about 2 to 1. The same applies to the tuning range of the individual receiving circuits remaining within the practical limits of the standard commercial variable condenser. This is a very important feature of the invention from the point of view of design and production.

Generally, for a given total frequency range, the number and widths of the overlapping sub-bands for a desired intermediate frequency are related according to the following formula:

$$f_n - nf_1 = (n-1)f_i$$

wherein:

$f_1$ represents the tuning frequency of the first sub-band for any adjusting position of the circuits, $f_n$ represents the tuning frequency of the nth sub-band, $n$ is the number of circuits or frequency conversions used, and $f_i$ represents the intermediate frequency.

Thus, referring to the above example of a desired total band from 40 mc. to about 300 mc., $n$ was chosen as 3 to keep the individual tuning range of all the circuits within a practical limit of 2.5 to 1, resulting in a frequency range for the first circuit $f_1$ equal to 40 mc. to 100 mc. With the intermediate frequency $f_i$ having been chosen as 10 mc., the ranges for the second and third sub-bands may be determined from the formula as follows:

$f_2 = f_i + 2f_1$ i. e. from 90 mc. to 210 mc.

$f_3 = 2f_i + 3f_1$ i. e. from 140 mc. to 320 mc.

The range of the oscillator O may be easily determined, once the intermediate frequency has been decided upon, from the first or lowest sub-band. Thus, in the example shown, the latter extends from 40 mc. to 100 mc., resulting in an oscillator frequency range of 50 to 110 mc. for an intermediate frequency of 10 mc.

If the antenna is connected to all circuits simultaneously, the entire frequency range from 40 mc. to 320 mc. may be scanned quickly for search purposes by merely tuning the receiver over the limited tuning or condenser ratio 2.5 to 1.

Referring to Figure 2, there is shown a more detailed circuit diagram of a broad band receiving system of the type shown in Figure 1, embodying three electronic mixer tubes $T_1$, $T_2$ and $T_3$ as frequency converters or modulators such as penta-grid converters or equivalent multi-electrode tubes known in the art. The outer control grids near the plates of the tubes are all simultaneously excited from the single converting oscillator O through a common coupling condenser $Co_1$, while the inner control grids near the cathodes of said tubes are excited by the respective sub-band tuning circuits $C_1$, $C_2$ and $C_3$ each of which may be connected or coupled with the common broad band receiving antenna A, by way of coupling coils $c_1$, $c_2$ and $c_3$, respectively, and the selective wave switch S. The oscillator O is advantageously designed to possess high stability and freedom from harmonics, to improve the all-over efficiency and selectivity of the system. A simple oscillator circuit having these characteristics suitable for use in connection with the invention, although not limited thereto, is shown in Figure 4 to be described presently.

The oscillator O having an adjustable tank circuit Co is ganged with the tuning circuits $C_1$, $C_2$ and $C_3$ by means of a common control shaft or the like and setting member indicated schematically by dotted lines at C in the drawing. The output current of the last converter $T_1$ is applied (by way of coupling coil $c_i$) to the intermediate frequency input circuit *Ci* which is resonant to the predetermined fixed frequency of 10 mc. in the example shown.

In the example shown in the drawings, the oscillator frequency has been assumed to be higher than the frequency of the lowest frequency band of circuit $C_1$, resulting in the tuning ranges for the circuits $C_2$ and $C_3$ as described and indicated. It is, furthermore, possible to use an oscillator frequency range which is lower than the tuning frequency range of the circuit $C_1$, that is, in the example shown, a range from 30 mc. to 90 mc. In this case, the tuning range for the circuits $C_2$ and $C_3$ will be from 70 mc. to 190 mc., and from 100 mc. to 280 mc., respectively, obtained by reversing the sign of $f_1$ in the above formula. The all-over range of the system will be somewhat less than originally intended, while in the example shown the all-over range is somewhat greater than the intended range. However, by choosing, in the example shown in the drawing, an initial all-over range somewhat less than desired, and by choosing, in the example aforementioned, an all-over range somewhat greater than desired, a final resultant tuning range may be obtained equal to or sufficiently approximating any finally desired operating range.

A multiple conversion circuit described hereinabove is especially suited for providing feedback, both negative and positive, from a subsequent to a previous conversion or mixer stage, such as shown in Figure 2. The principle involved in this method of feedback or reflexing consists in progressively passing on the frequency difference as developed in the output of a converting oscillator stage to the input of the next stage and reflexing or feeding back in the reverse direction the sum frequencies likewise developed by the converting oscillator upon the input circuit of a previous stage. Such feedback may be of the positive type for boosting the input signals of the higher and less efficient portion of the total frequency spectrum, or negative feedback may be employed for stabilization or to obtain any other effects that may be desired.

Thus, referring to Figure 2, there is developed, in the upper limit position of the common tuning adjustment, in the plate circuit of tube $T_1$ the difference frequency 110 mc.−100 mc.=10 mc. and besides the sum frequency $$110 \text{ mc.}+100 \text{ mc.}=210 \text{ mc.}$$

The difference frequency of 10 mc. is selected by the circuit *Ci* and passed to the intermediate frequency amplifier I, while the sum of 210 mc. is shown to be fed back (through coupling condenser $Co_2$) upon the input circuit $C_2$ of the preceding converter stage $T_2$ which is resonant to the frequency of 210 mc., as is understood from the above.

Likewise, in the plate circuit of tube $T_2$, there is present the difference frequency $$210 \text{ mc.}-110 \text{ mc.}=100 \text{ mc.}$$

which is passed on to circuit $C_1$ resonant to this frequency, and also the sum frequency $$210 \text{ mc.}+110 \text{ mc.}=320 \text{ mc.}$$

which is shown to be fed back through coupling condenser $Co_3$ upon the input circuit $C_3$ of the preceding converter stage which is resonant to this frequency, as is readily understood from the above. Condensers $Co_2$ and $Co_3$ may be replaced by coupling transformers in which case the feedback can be adjusted to be either positive or negative by the proper connection of the input and output terminals of the transformers, as is understood. Alternatively, the phase of the feedback potentials may be controlled by the proper polarity connection of any of the coupling coils of the circuits $C_1$ and $C_2$, in a manner readily understood.

In the example shown, assuming the feedback to be positive or regenerative, the effect will be to boost the signals at the higher frequency end received by circuits $C_2$ and $C_3$ when the switch S is in positions 2 or 3, respectively, thus compensating for the reduced efficiency at the higher frequencies. If the lowest sub-band is received, with the switch S in position 1, circuits $C_2$ and $C_3$ which normally would be idle will now become effective in producing additional amplification and enhancing selectivity, in that part of the output signal energy of tube $T_1$ is fed back through feed back condenser $Co_2$ upon the input grid of tube $T_2$ and after amplification by the latter is re-applied to the input circuit $C_1$. Similarly, part of the output signal energy of tube $T_2$ is fed back through feed back condenser $Co_3$ upon the input grid of tube $T_3$ and after amplification by the latter and tube $T_2$ is applied to the input circuit $C_1$.

If the feedback is negative, it will act to stabilize the operation of the system, especially at the higher frequencies, and to reduce noise, in particular tube noise in the converters which is becoming more and more of a problem as the operating frequency is increased.

Figure 3 is a block diagram of a receiving system according to the invention utilizing a single broad band short wave antenna such as a dipole coupled through a coaxial transmission line to several receivers each designed for a different frequency range.

A broad band dipole antenna $A_1$—$A_2$ or the like is used for receiving the high and ultra-high frequencies which are fed to the receiver wave switch S through a coaxial cable *Ca* in the manner shown and well understood. The short wave receiver illustrated is of substantially the same type as described hereinbefore and designed to cover an extended band within the high and ultra-high frequency range such as in the example described above. Moreover, any other type of short wave receivers may be provided. as is understood.

For the lower frequencies, where the antenna characteristics are far less important and the dipole $A_1$—$A_2$ is less efficient or unsuited, the outer conductor of the coaxial line *Ca* is used as an ordinary antenna according to the present invention. The method of coupling a receiver to this outer conductor is important because of the requirement of obtaining sufficient coupling without in any way disturbing or interfering with the operation of the transmission line. The coupling arrangement provided for this purpose and used according to the invention consists of a preferably elongated toroidal coupling coil surrounding or being inductively coupled with the outer conductor of the transmission line. This coil serves as an input coupling for an associated low frequency or medium frequency receiver and its inductance is so chosen as to correspond with the frequencies to be received. In the example illustrated, two such coupling coils $W_1$ and $W_2$ are shown coupled with or encircling the cable *Ca* and serving to feed low and medium frequency receivers $R_1$ and $R_2$, respectively, of any design and construction well known in the art. In place of an inductive coupling, a capacitative coupling or in fact any type of antenna coupling circuit well known in the art may be used by treating the outer conductor of the cable *Ca* as any open antenna or aerial conductor. If the length of the cable *Ca* is great in comparison with the wave length, the outer conductor will act as a so-called wave antenna and the coupling coils $W_1$ and $W_2$ should be located at or near a current maximum as pointed out. Alternatively, in the case of capacitative coupling, the coupling point should be at a voltage maximum, as is understood.

If, on the other hand, the wave length is substantially greater than the length of the cable, it is advisable to insert a coupling impedance such as a coupling transformer *Tr* between the end of the cable and ground, which serves as an input coupling means for the long wave receiver R as shown in Figure 3A of the drawings.

As pointed out hereinabove, the heterodyning oscillator in a receiver of the type according to the invention involving multiple frequency conversion should be as free as possible from higher harmonics to avoid interference from and distortion due to undesirable signals. It is advantageous, therefor, that all harmonic frequencies developed by the converting oscillator be suppressed.

An improved oscillator suitable for this purpose, but applicable for other uses, is shown in Figure 4 of the drawings. The oscillator per se may be of any known design comprising essentially an oscillating tube T such as a triode as shown, a grid tank circuit Co whose frequency may be continuously variable such as by means of a variable condenser as indicated in the drawing and a feedback coil or other feedback means in its plate circuit in regenerative coupling with said tank circuit to generate sustained electrical oscillations having a frequency determined by the tank circuit tuning, as is well known to and understood by those skilled in the art. A variety of other oscillator circuits are well known and may be substituted for the special circuit shown in the drawing for illustration of the invention.

In accordance with the present improvement, there is inserted in the plate circuit of the oscillator tube T a transformer comprising two primary windings $w_1$ and $w_2$ acting upon or being coupled differentially with a common secondary winding $w_3$. The latter serves for feeding the oscillations generated to a load circuit connected to the output terminals *o—o* in the drawing.

Loosely coupled with one of the primary windings of the output transformer, in the example shown the winding $w_2$ is a tunable trap circuit *Ct* which has its tuning frequency controlled in unison or synchronism with the tank circuit Co, as indicated by the common operating or connecting link C in the drawing. The trap circuit *Ct* is so designed and adjusted as to continuously track with or be tuned to the same frequency as the oscillator tank circuit Co. Since circuit *Ct* is coupled inductively, capacitatively or otherwise with the primary winding $w_2$, it will reflect an impedance upon the latter, whereby to upset the differential balance and to result in a voltage being induced in the secondary $w_3$. This will occur only at the fundamental frequency generated by the oscillator to which circuit *Ct* is automatically tuned by virtue of the simultaneous operation with the tank circuit adjustment, as described hereinbefore. If only a single frequency is desired, fixedly tuned circuits Co and *Ct* resonant to the same frequency may be provided, as is understood.

For all harmonic frequencies, circuit *Ct* will be completely out of tune and will therefor have little or no effect upon the primary winding $w_2$. The differential balance will therefor be maintained at all harmonic frequencies and the output obtained from terminals *o—o* will be substantially harmonic free.

This same principle may be used in connection with any high frequency amplifier in which case for instance tube T in Figure 4 represents an amplifier stage with or without feedback, with the result that a sharp cutoff is obtained on either side of the resonant frequency as shown more clearly in Figure 5, wherein $r_1$ represents a resonance curve without the selective differential coupling according to the invention, i. e. determined solely by the characteristics of circuit Co, and wherein $r_2$ shows the resonance curve obtained by employment of the improvement as shown in Figure 4. The sharpness of the cut-off at the frequencies $f_1$ and $f_2$ below and above the resonant frequency $f_r$ depends largely on the design of the trap circuit and may be varied within wide limits by varying the Q of the circuit, i. e. in practice the Q of the inductive reactance of the circuit. The effect obtained may be likened to a rapid reduction of the coupling between the primary and secondary of the transformer as the frequency varies to plus or minus the resonant frequency, as understood from Figure 5.

While there have been shown and described a few desirable embodiments of the invention, it is understood that this disclosure is for the purpose of illustration and that obvious changes in proportion, arrangement of parts, as well as the substitution of equivalent elements for those herein shown and described may be made without departing from the spirit of the invention as defined in the appended claims.

The specification and drawings are accordingly to be regarded in an illustrative rather than a restrictive sense.

I claim:

1. In a multi-range high-frequency receiver of the superheterodyne type, the combination which comprises a signal input circuit, a first frequency changer, means for generating local oscillations, means for applying said local oscillations to said frequency changer, a first selective receiving circuit connected to the input of said frequency changer, whereby to reduce a received signal frequency to a predetermined intermediate frequency in the output of said frequency changer, a second selective receiving circuit and frequency changer connected thereto and preceding said first frequency changer and selective circuit in cascade connection, means for applying said local oscillations to said second frequency changer, said second selective circuit being tuned to a frequency equal to the sum of the tuning frequency of said first selective circuit and the frequency of said local oscillations, and means for selectively connecting said signal input circuit to said first and second receiving circuit.

2. In a multi-range high-frequency receiver of the superheterodyne type, the combination which comprises a signal input circuit, a first frequency changer, adjustable means for generating local oscillations, a first tunable selective receiving circuit covering a predetermined frequency range and being connected to the input of said frequency changer means for applying said local oscillations to said frequency changer, a second tunable selective circuit and frequency changer connected thereto and preceding said first receiving circuit and frequency changer in cascade connection, means for applying said local oscillations to said second frequency changer, means for selectively connecting said signal input circuit to said first and second receiving circuit, and uni-control means for simultaneously adjusting said generating means and both said receiving circuits, said second receiving circuit covering a frequency range differing from the frequency range of said first receiving circuit, whereby to reduce a signal frequency received by said first and second receiving circuits to a predetermined intermediate frequency in the output of said first frequency changer through simple and double frequency conversion, respectively.

3. In a multi-range high-frequency receiver of the superheterodyne type, the combination which comprises a signal input circuit, a first frequency changer, adjustable means for generating local oscillations covering a predetermined frequency range, a first tunable selective receiving circuit connected to the input of said frequency changer and covering a frequency range equal to and displaced from the frequency range of said generating means by a predetermined difference frequency, means for applying said local oscillations to said frequency changer, a second tunable selective receiving circuit and frequency changer connected thereto and preceding said first receiving circuit and frequency changer in cascade connection, means for applying said local oscillations to said second frequency changer, further means for selectively connecting said signal input circuit to said first and second receiving circuit, and uni-control means for simultaneously adjusting said generating means and both said receiving circuits, said second receiving circuit having a frequency range differing from and being higher than the frequency range of said first receiving circuit, whereby to reduce a received signal frequency in said first and second receiving circuits to said predetermined frequency in the output of said first frequency changer through simple and double frequency conversion, respectively.

4. In a multi-range high-frequency receiver of the superheterodyne type, the combination which comprises a signal input circuit, a first frequency changer, adjustable means for generating local oscillations covering a predetermined frequency range, a first tunable selective receiving circuit connected to the input of said frequency changer and having a receiving frequency range equal to and higher than the frequency range of said generating means by a predetermined difference frequency, means for applying said local oscillations to said second frequency changer, a second tunable selective receiving circuit and frequency changer connected thereto and preceding said first receiving circuit and frequency changer in cascade connection, means for applying said local oscillations to said second frequency changer, further means for selectively connecting said signal input circuit to said first and second receiving circuit, and uni-control means for simultaneously adjusting said generating means and both said receiving circuits, said second receiving circuit having a frequency range higher than and differing from the frequency range of said first receiving circuit, whereby to reduce a received signal frequency in said first and second receiving circuits to said predetermined difference frequency in the output of said first frequency changer through single and double frequency conversion, respectively.

5. In a receiver as claimed in claim 4, means for impressing sum frequency signals developed in the output of said first frequency changer upon the input of said second frequency changer.

6. In a receiver as claimed in claim 4, means for impressing sum frequency signals developed in the output of said first frequency changer upon said second receiving circuit in inverse phase relation to a corresponding signal frequency received therein.

7. In a multi-range high-frequency receiver of the superheterodyne type, the combination which comprises a signal input circuit, a plurality of frequency changers, a plurality of tunable selective receiving circuits having different receiving frequency ranges, means to connect each of said receiving circuits to the input of one of said frequency changers and to connect the resultant pairs of selective circuits and frequency changers in cascade, adjustable means for generating local oscillations, means for simultaneously applying said local oscillations to all said frequency changers, further means for selectively connecting said receiving circuits to said signal input circuit, and uni-control means for simultaneously adjusting said generating means and all said receiving circuits, the last receiving circuit having a frequency range equal to and displaced relative to the frequency range of said generating means to produce a predetermined intermediate frequency in the output of the last frequency changer, and the frequency ranges of the preceding receiving circuits being determined by the formula:

$$f_n=(n-1)f_i+nf_1$$

wherein $f_1$ represents a frequency within the range of the last selective circuit, $f_n$ represents a frequency within the range of the nth preceding selective circuit, $n$ is the number of selective circuits and frequency changers and $f_i$ represents said intermediate frequency.

8. In a multi-range high-frequency receiver of the superheterodyne type, the combination which comprises a signal input circuit, a first frequency changer, adjustable means for generating local oscillations covering a predetermined frequency range, a first tunable selective receiving circuit connected to the input of said frequency changer, a second tunable selective receiving circuit and frequency changer connected thereto and preceding said first frequency changer and receiving circuit in cascade connection, means for applying said local oscillations to both said frequency changers, further means for selectively connecting said receiving circuits to said signal input circuit, and uni-control means for simultaneously adjusting said generating means and both said receiving circuits, said first receiving circuit having a frequency range equal to and displaced from the frequency range of said generating means by a predetermined difference frequency, and said second receiving circuit comprising a frequency range having a lower limit frequency equal to the sum of the lower limit frequencies of said generating means and said first receiving circuit and having an upper limit frequency equal to the sum of the upper limit frequencies of said generating means and said first receiving circuit, whereby to reduce varying signal frequencies received by said first and second receiving circuits to said difference frequency by single and double frequency conversion, respectively.

FREDERICK A. KOLSTER.

REFERENCES CITED

The following references are of record in the file of this patent:

UNITED STATES PATENTS

| Number | Name | Date |
|---|---|---|
| 1,452,339 | Heising | Apr. 17, 1923 |
| 1,647,609 | Cotter | Nov. 1, 1927 |
| 1,965,539 | Amy | July 3, 1934 |
| 2,064,400 | Aceves | Dec. 15, 1936 |
| 2,113,157 | Landon | Apr. 5, 1938 |
| 2,151,810 | Siemens | Mar. 28, 1939 |
| 2,154,073 | Koch | Apr. 11, 1939 |
| 2,173,898 | Conron et al. | Sept. 26, 1939 |
| 2,186,980 | Lowell | Jan. 16, 1940 |
| 2,211,352 | Simpson | Aug. 13, 1940 |
| 2,245,385 | Carlson | June 10, 1941 |
| 2,263,613 | Conron | Nov. 25, 1941 |
| 2,282,092 | Roberts | May 5, 1942 |